(12) United States Patent
Baeckler

(10) Patent No.: US 9,304,899 B1
(45) Date of Patent: Apr. 5, 2016

(54) NETWORK INTERFACE CIRCUITRY WITH FLEXIBLE MEMORY ADDRESSING CAPABILITIES

(75) Inventor: Gregg William Baeckler, San Jose, CA (US)

(73) Assignee: Altera Corporation, San Jose, CA (US)

( * ) Notice: Subject to any disclaimer, the term of this patent is extended or adjusted under 35 U.S.C. 154(b) by 152 days.

(21) Appl. No.: 13/594,591

(22) Filed: Aug. 24, 2012

(51) Int. Cl.
*G06F 12/00* (2006.01)
*G06F 12/02* (2006.01)

(52) U.S. Cl.
CPC .................................. *G06F 12/023* (2013.01)

(58) Field of Classification Search
CPC ...... G06F 12/023; G06F 3/067; G06F 9/5016
USPC .......................................................... 711/170
See application file for complete search history.

(56) References Cited

U.S. PATENT DOCUMENTS

| | | | |
|---|---|---|---|
| 4,920,483 A | | 4/1990 | Pogue et al. |
| 4,931,925 A | | 6/1990 | Utsumi et al. |
| 5,423,010 A | | 6/1995 | Mizukami |
| 5,581,310 A | * | 12/1996 | Vinekar et al. ................. 348/718 |
| 5,774,697 A | | 6/1998 | Hall |
| 6,343,352 B1 | * | 1/2002 | Davis et al. .................... 711/158 |
| 7,660,167 B1 | * | 2/2010 | Roge et al. ............... 365/189.05 |
| 7,701,997 B2 | | 4/2010 | Tal et al. |
| 7,884,829 B1 | * | 2/2011 | Van Dyke et al. ............. 345/544 |
| 8,514,634 B1 | * | 8/2013 | Wu .......................... 365/189.011 |
| 2002/0191588 A1 | * | 12/2002 | Personick ...................... 370/352 |
| 2004/0034758 A1 | * | 2/2004 | Rampogna et al. ............ 711/220 |
| 2005/0080953 A1 | * | 4/2005 | Oner et al. ....................... 710/52 |
| 2010/0228885 A1 | * | 9/2010 | McDaniel ......................... 710/5 |
| 2012/0066432 A1 | * | 3/2012 | Miura ............................ 711/102 |
| 2012/0084482 A1 | * | 4/2012 | Yamanaka et al. ............. 710/305 |
| 2012/0317380 A1 | * | 12/2012 | Agrawal et al. ............... 711/159 |
| 2014/0013088 A1 | * | 1/2014 | Eshel-Goldman et al. ... 712/226 |

* cited by examiner

*Primary Examiner* — Charles Rones
*Assistant Examiner* — Nanci Wong
(74) *Attorney, Agent, or Firm* — Treyz Law Group; Jason Tsai; Vineet Dixit

(57) ABSTRACT

An integrated circuit that includes network interface circuitry is provided. The network interface circuitry may include memory for buffering incoming data and associated control circuitry for loading the incoming data into and retrieving data from memory. The memory may be organized into multiple individually addressable memory blocks. The control circuitry may include read and write barrel shifters, a controller for providing read and write address signals, write address circuitry for controlling the write barrel shifter and for generating write address bits, and read address circuitry for controlling the read barrel shifter and for generating read address bits. The read and write circuitry may each include division and modulus arithmetic circuits for processing the address signals received from the controller and may include control logic for generating the read and write address bits that are used to address each of the multiple memory blocks.

23 Claims, 10 Drawing Sheets

| Addr_Wsub | rot_sel2 | rot_sel1 | rot_sel0 |
|---|---|---|---|
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |

FIG. 5

| Addr_Wsub | row_sel0 | row_sel1 | row_sel2 | row_sel3 | row_sel4 |
|---|---|---|---|---|---|
| 0 | 0 | 0 | 0 | 0 | 0 |
| 1 | 1 | 0 | 0 | 0 | 0 |
| 2 | 1 | 1 | 0 | 0 | 0 |
| 3 | 1 | 1 | 1 | 0 | 0 |
| 4 | 1 | 1 | 1 | 1 | 0 |

FIG. 7

NETWORK INTERFACE CIRCUITRY WITH FLEXIBLE MEMORY ADDRESSING CAPABILITIES

BACKGROUND

This relates generally to integrated circuits, and more particularly, to integrated circuits with memory.

Integrated circuits with memory are often used to support high speed data transfer between different network components. In particular, such types of integrated circuits typically include random access memory (RAM) elements arranged in an array. Consider a scenario in which an integrated circuit receives bursts of eight data words at regular time intervals. Each burst of eight data words can then be stored in a selected row in the RAM array.

In the scenario above, it may sometimes be desirable to retrieve a group of eight data words that span a portion of a first row in the RAM array and a portion of a second row that is adjacent to the first row. In conventional memory addressing schemes, data can only be read out on a row-by-row basis. In order to retrieve the group of eight data word spanning the two rows, the entire first and second rows will have to be read out. Since each of the first and second rows includes eight data words, a total of 16 data words will have to be read out. The desired group of eight data words can then be extracted from the 16 data words that have been read out.

In modern high speed data communications network, handling data using this conventional approach can be unacceptably inefficient. It may therefore be desirable to provide interface circuitry with improved memory addressing capabilities.

SUMMARY

An integrated circuit having network interface circuitry is provided. The network interface circuitry may include memory and associated control circuitry. The memory may be organized into multiple individually addressable memory blocks. The memory control circuitry may include a memory controller, read and write data reordering circuits (e.g., read and write pipelined barrel shifters) and addressing circuitry such as read and write address circuitry for individually addressing each of the different memory blocks.

The write address circuitry may include arithmetic circuits such as a division circuit and a modulus circuit and write control logic. The write address circuitry may receive write address signals from the memory controller. The modulus and division circuits may perform desired arithmetic operations on the write address signals and may output corresponding bits to the write control logic. The write control logic may output control bits to the write barrel shifter based on a predetermined lookup table and may output address bits to the memory blocks via corresponding first multiplexers. The write control logic may also include a mask control circuit operable to generate bits for controlling each of the first multiplexers.

Similarly, the read address circuitry may include a division circuit and a modulus circuit and read control logic. The read address circuitry may receive read address signals from the memory controller. The modulus and division circuits in the read address circuitry may perform desired arithmetic operations on the read address signals and may output corresponding bits to the read control logic. The read control logic may output control bits to the read barrel shifter based on a predetermined lookup table and may output address bits to the memory blocks via corresponding second multiplexers. The read control logic may also include an additional mask control circuit operable to generate bits for controlling each of the second multiplexers.

Consider an example in which the integrated circuit receives a first group of data from external network equipment. The first group of data may be loaded into the different memory blocks using a write clock. In particular, the first group of data may be reordered using the write barrel shifter based on the controls bits generated by the write control logic. A first portion of the first group of data may be loaded into a first row in a first subset of the memory blocks while a second portion of the first group of data may simultaneously be loaded into a second row that is adjacent to the first row in a second subset of the memory blocks (e.g., data that has been stored in the first row in the second subset of memory blocks and data that has been stored in the second row in the first subset of memory blocks may be unaltered).

Consider another example in which a second group of data may be read out from the different memory blocks during data retrieval operations. The first and second groups of data may have different data widths. In particular, a first portion of the second group of data may be read out by accessing a third row in selected memory blocks while a second portion of the second group of data may be simultaneously read out by accessing a fourth row that is different than the third row in remaining memory blocks other than the selected memory blocks. Data that is read out in this way may be reordered using the read barrel shifter based on the control bits generated by the read control logic. The reordered read data may then be output to external network equipment.

Further features of the present invention, its nature and various advantages will be more apparent from the accompanying drawings and the following detailed description.

BRIEF DESCRIPTION OF THE DRAWINGS

FIG. 5 is a lookup table containing illustrative control bits for configuring the barrel shifter of FIG. 4 in accordance with an embodiment of the present invention.

FIG. 7 is a table illustrating control bits that can be generated using a masking circuit of the type shown in FIG. 6 in accordance with an embodiment of the present invention.

DETAILED DESCRIPTION

Figure 1:
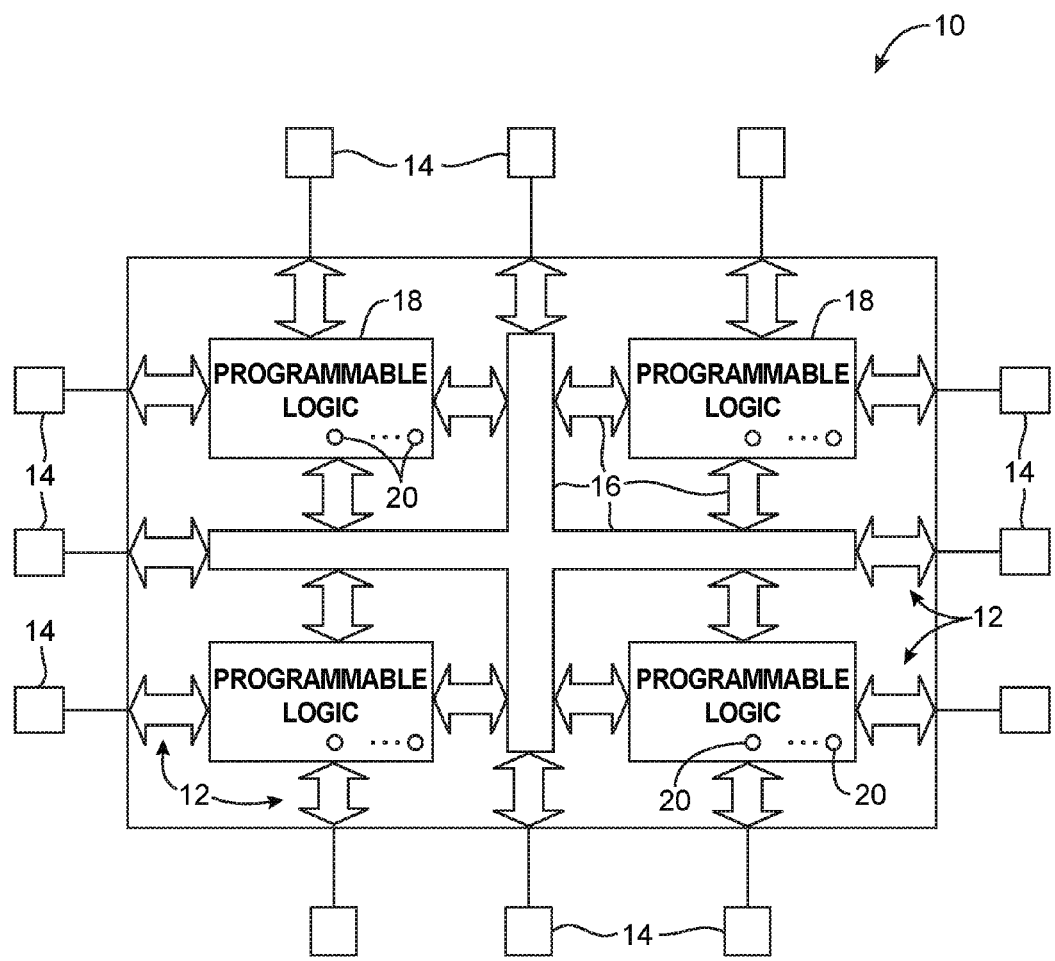
FIG. 1 is a diagram of an illustrative programmable integrated circuit in accordance with an embodiment of the present invention.

An illustrative integrated circuit of the type that may be provided with memory elements and associated circuits that can be controlled using output signals from the memory elements is shown in FIG. 1. As shown in FIG. 1, integrated circuit 10 may contain memory elements 20. Memory elements 20 may be loaded with configuration data to configure programmable transistors such as pass transistors (sometimes referred to as pass gates or pass gate transistors) in programmable circuitry (programmable logic) 18.

Because memory elements 20 may be used in storing configuration data for programmable logic 18, memory elements 20 may sometimes be referred to as configuration random-access memory elements (CRAM). Integrated circuit 10 may be configured to implement custom logic functions by configuring programmable logic 18, so integrated circuit 10 may sometimes be referred to as a programmable integrated circuit.

As shown in FIG. 1, programmable integrated circuit 10 may have input/output circuitry 12 for driving signals off of device 10 and for receiving signals from other devices via input/output pins 14. Interconnection resources 16 such as global and local vertical and horizontal conductive lines and buses may be used to route signals on device 10. Interconnection resources 16 may include fixed interconnects (conductive lines) and programmable interconnects (i.e., programmable connections between respective fixed interconnects).

Programmable logic 18 may include combinational and sequential logic circuitry. Programmable logic 18 may be configured to perform a custom logic function. The programmable interconnects associated with interconnection resources 16 may be considered to form a part of programmable logic 18.

When memory elements 20 are loaded with configuration data, the memory elements each provide a corresponding static control output signal that controls the state of an associated logic component in programmable logic 18. The memory element output signals may, for example, be used to control the gates of metal-oxide-semiconductor (MOS) transistors such as n-channel metal-oxide-semiconductor (NMOS) pass transistors in programmable components such as multiplexers, logic gates such as AND gates, NAND gates, etc. P-channel transistors (e.g., a p-channel metal-oxide-semiconductor pass transistor) may also be controlled by output signals from memory elements 20, if desired. When a memory element output that is associated with an NMOS pass transistor is high, the pass transistor controlled by that memory element is turned on and passes logic signals from its input to its output. When the memory element output is low, an NMOS pass transistor is turned off and does not pass logic signals. P-channel metal-oxide-semiconductor (PMOS) pass transistors are turned on when the signal that is applied to its gate from the output of a memory element is low (e.g., 0 volts) and are turned off when the output of the memory element is high (i.e., the polarity for NMOS and PMOS control signals is reversed).

Configuration random-access memory elements 20 may be arranged in an array pattern. There may be, for example, millions of memory elements 20 on integrated circuit 10. During programming operations, the array of memory elements is provided with configuration data. Once loaded with configuration data, memory elements 20 may selectively control (e.g., turn on and off) portions of the circuitry in the programmable logic 18 and thereby customize the circuit functions of circuit 10.

The circuitry of programmable integrated circuit 10 may be organized using any suitable architecture. As an example, the circuitry of programmable integrated circuit 10 may be organized in a series of rows and columns of programmable logic blocks (regions) each of which contains multiple smaller logic regions. The logic resources of integrated circuit 10 may be interconnected by interconnection resources 16 such as associated vertical and horizontal conductors. These conductors may include global conductive lines that span substantially all of device 10, fractional lines such as half-lines or quarter lines that span part of device 10, staggered lines of a particular length (e.g., sufficient to interconnect several logic areas), smaller local lines, or any other suitable interconnection resource arrangement. If desired, the circuitry of programmable integrated circuit 10 may be arranged in more levels or layers in which multiple large regions are interconnected to form still larger portions of logic. Still other device arrangements may use logic that is not arranged in rows and columns.

The example of FIG. 1 in which device 10 is described as a programmable integrated circuit is merely illustrative and does not serve to limit the scope of the present invention. The method and apparatus described herein may be incorporated into any suitable circuit. For example, the method and apparatus may also be incorporated into numerous types of devices such as microprocessors, digital signal processors, application specific standard products (ASSPs), application specific integrated circuits (ASICs), programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), just to name a few.

Figure 2:
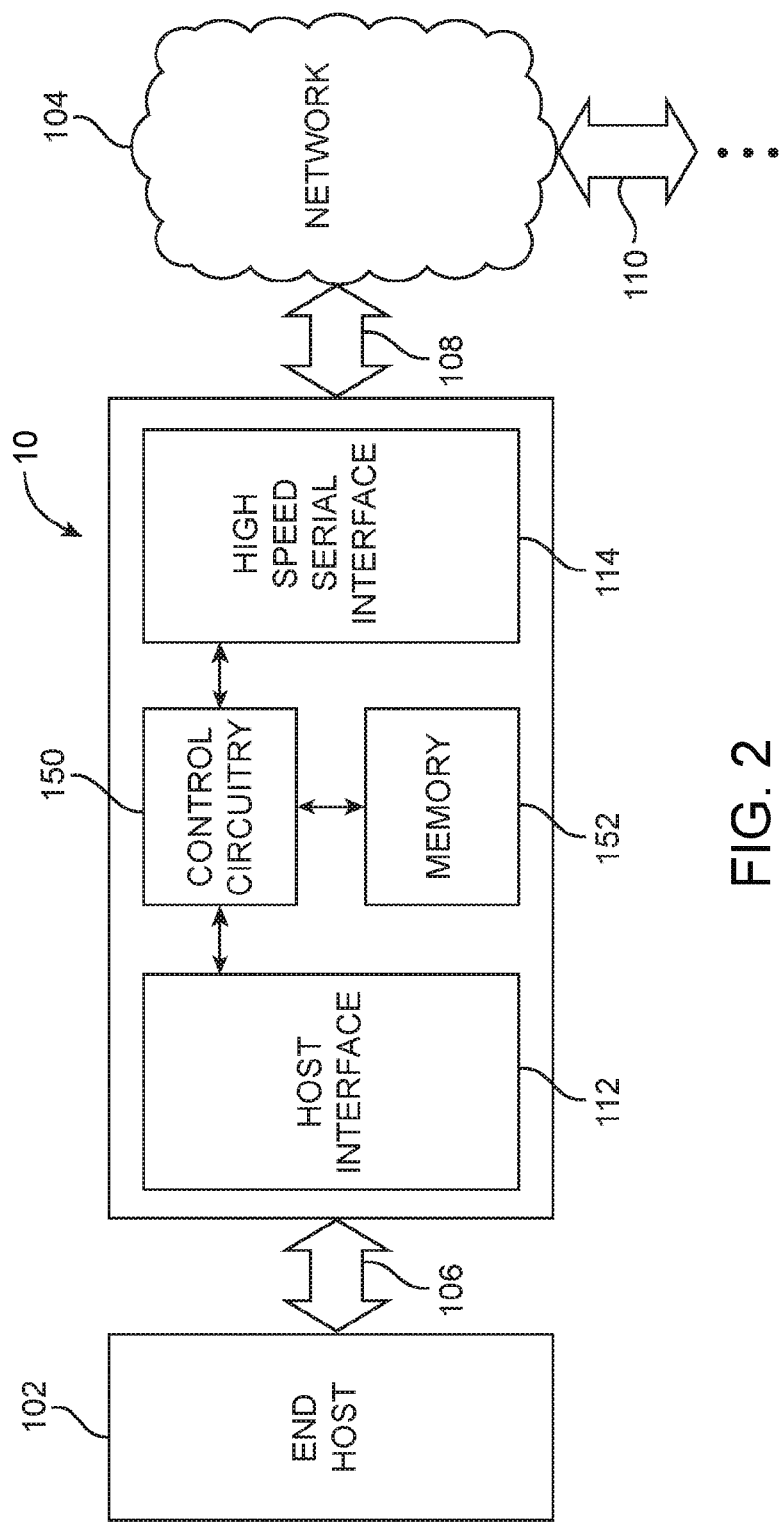
FIG. 2 is a diagram of illustrative network interface circuitry in accordance with an embodiment of the present invention.

In one suitable embodiment of the present invention, device 10 may be configured to serve as an interface between an end host and a communications network (see, e.g., FIG. 2). As shown in FIG. 2, an end host such as end host 102 may be coupled to a communications network 104 using network interface device 10. Device 10 used in this way may be referred to as a network interface circuit and may sometimes be formed as an integral part of end host 102. End host 102 may, for example, be a personal computer, server, and other computing equipment. Network 104 may be a local area network such as an Ethernet network or a regional network that is coupled to the Internet. Network 104 may be coupled to any number of end hosts, network servers, or other computing equipment, as indicated by path 110.

Device 10 may include host interface circuitry 112, high speed serial interface (HSSI) circuitry 114, memory 152, and memory control circuitry 150. Memory 152 may include memory elements arranged in rows and columns (as an example). Host interface 112 may, for example, send data to and receive data from processing circuitry in end host 102 via a parallel data link 106 (e.g., data bits may be transmitted in parallel through link 106). High speed serial interface 114 may be configured to implement physical layer functionalities and data link layer functionalities and may be used to send data to and receive data from network 104 via a serial data link 108 (e.g., packets may be serially transmitted through link 108).

Data may be conveyed between host interface 112 and high speed serial interface 114 using control circuitry 150. For example, consider a first scenario in which device 10 receives incoming data bursts from network 104. Interface 114 may forward one data burst at a time to control circuitry 150. Control circuitry 150 may then store the data burst in selected portions of memory 152. Upon request from end host 102, control circuitry 150 may retrieve information stored in memory 152 (e.g., by accessing desired portions of memory 152) and may forward the retrieved information to end host 102 via interface 112 and path 106.

Consider a second scenario in which device 10 receives data from end host 102. Interface 112 may divide the received data into separate groups of data bits and may forward the data bits to control circuitry 150. Control circuitry 150 may then store the data bits in selected portions of memory circuitry 152. When interface 114 is available to transmit information to network 104, control circuitry 150 may retrieve information from memory 152 (e.g., by accessing desired portions of memory 152) and may forward the retrieved information to interface 114. Interface 114 may then packetize the retrieved information and may transmit the corresponding packets to network 104 via path 108.

Network interface device 10 of the type described in connection with FIG. 2 is merely illustrative and does not serve to limit the scope of the present invention. If desired, device 10 may be configured to connect end host 102 to any type of network 104 and may be configured to support any type of network communications protocol.

Data may arrive at device 10 at fairly high data rates. As an example, 64 bytes of data may arrive at device 10 every 3 nanoseconds. The 64 bytes of data may be divided in N data words (e.g., each of the N data words may contain 64/N bytes). In one embodiment, the N data words may be written into a selected row within memory 152. The N data words may also be read out from memory 152 by accessing the selected row in memory 152. It may sometimes be desirable to read out a group of data words that span more than one row within memory 152. Similarly, it is sometimes desirable to be able to write N data words into a portion of a selected row and a portion of another row that is adjacent to the selected row in memory 152. It may therefore be desirable to provide more flexible memory addressing capabilities so that data can be loaded into and retrieved from addressable portions of memory 152.

Figure 3:
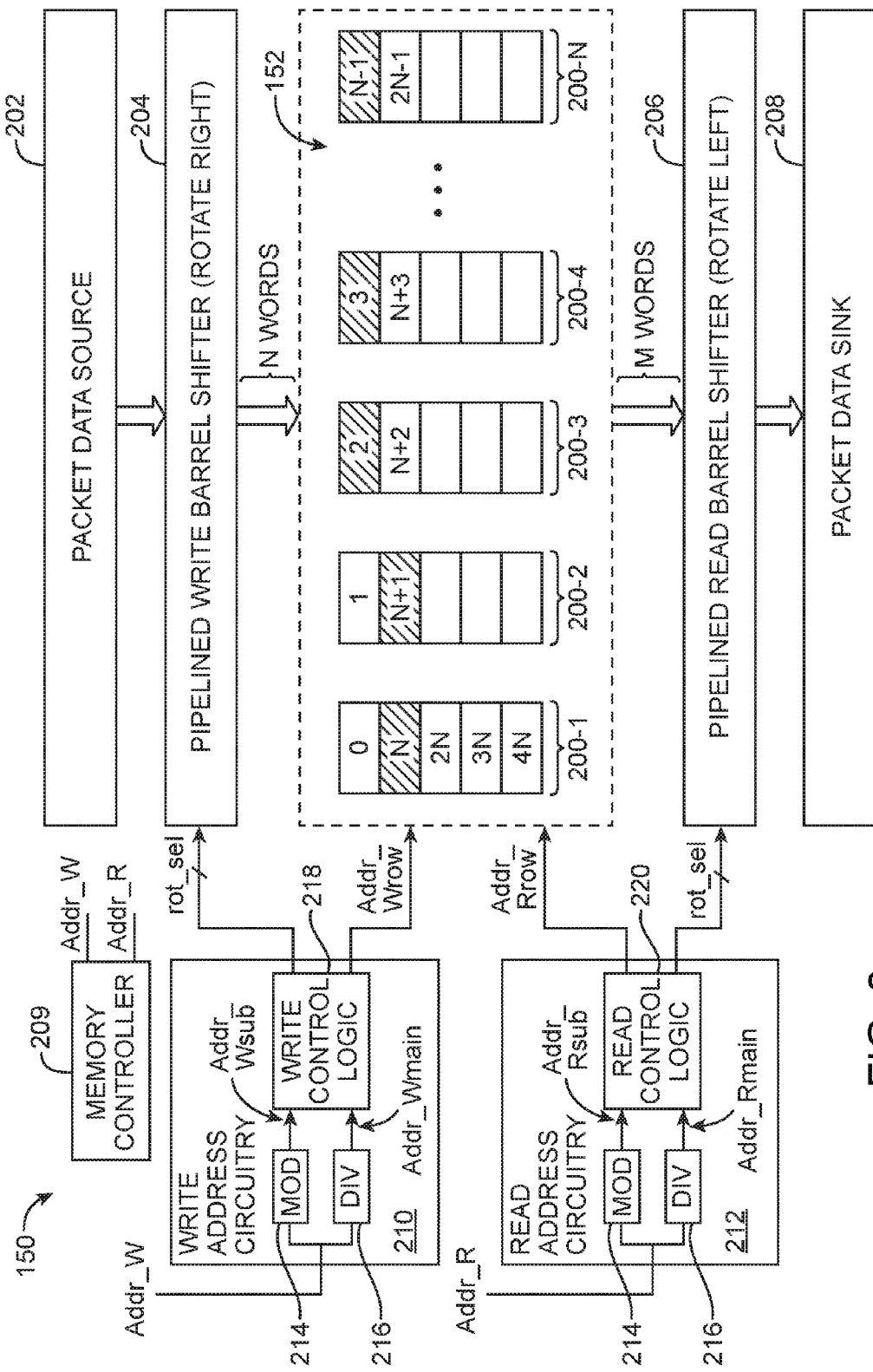
FIG. 3 is a diagram of an illustrative memory array with associated control circuitry in accordance with an embodiment of the present invention.

FIG. 3 is a diagram showing memory 152 and associated control circuitry 150 that can be used for selectively addressing memory 152. As shown in FIG. 3, memory 152 may be organized into N individually addressable memory blocks 200 (e.g., memory blocks 200 may be controlled using more than a single set of address bits). For example, memory 152 may be partitioned into a first memory block 200-1, a second memory block 200-2, a third memory block 200-3, . . . , and an N-th memory block 200-N. Each memory block 200 may be divided into multiple rows, only one of which is selected at any given point in time. A given row in a memory block 200 may be used to store one data word and may therefore sometimes be referred to as a memory word (e.g., a memory block 200 may be organized into multiple addressable rows each of which includes a memory word that is used to store a single data word).

When accessing memory 152, an address signal is provided that refers to a particular row in a selected one of memory blocks 200. For example, consider a scenario in which memory 152 is organized into eight memory blocks 200. An address signal having a value of "0" may serve to access the first row in each of the eight memory blocks (i.e., in memory word 0-7), whereas an address signal having a value of "8" may serve to access the second row in each of the eight memory blocks (i.e., memory words 8-15). As another example, an address signal of "2" may access the first row in a first subset of memory blocks 200 (i.e., memory words 2-7 may be accessed) and the second row in a second subset of memory blocks 200 (i.e., memory words 8 and 9 may be accessed). In other words, memory 152 can be addressed by individual words into addition to full row accesses. The example of FIG. 3 in which each memory block 200 includes five memory words is merely illustrative. In general, each memory block 200 may include any suitable number of individually addressable rows.

Control circuitry 150 may include a memory controller 209, addressing circuitry such as write address circuitry 210 and read address circuitry 212, data registers such as packet data source 202 and packet data sink 208, and data reordering circuitry such as pipelined write barrel shifter 204 and pipelined read barrel shifter 206. Packet data source 202 may receive data from one of interface circuitry 112 and 114 and may provide a data burst having N data words to pipelined write barrel shifter 204. Shifter 204 may be optionally configured to rotate the data words by an adjustable amount (e.g., to rotate the data words right by a desired number of data words that is less than N).

For example, consider a scenario in which memory 152 is configured to include seven memory blocks 200 and shifter 204 receives a seven-word burst containing data words "ABCDEFG", where each alphabet letter represents a respective data word. In one suitable arrangement, shifter 204 may not perform any shifting and may output data words "ABCDEFG" so that those data words is written into a selected row in memory 152 in that order (e.g., so that "ABCDEFG" are written into memory blocks 0-6, respectively). In another suitable arrangement, shifter 204 may perform a "rotate two data words right" operation so that "FGABCDE" is provided to memory 152. For example, "ABCDE" may be written into the first row of memory blocks 200-3, 200-4, 200-5, 200-6, and 200-7 while "FG" may be written into the second row of memory blocks 200-1 and 200-2 (e.g., so that "ABCDE" are respectively written into memory blocks 2-6 and so that "FG" are respectively written into memory blocks 7 and 8). In general, a group of rotated data words may be written into any two adjacent rows in memory 152 using this approach.

When retrieving data from memory 152, data that is read out from selected row(s) may be received by pipeline read barrel shifter 206. Generally, shifter 206 may receive M data words from memory 152, wherein M is either less than N, equal to N, or greater than N (e.g., the read and write ports may have different data widths). Shifter 206 may be optionally configured to rotate the data words by an adjustable amount (e.g., to rotate the data words left by a desired number of data words that is less than M).

For example, consider a scenario in which shifter 206 receives a five-word burst from memory 152. In one suitable arrangement, shifter 206 may receive a five-word burst containing "VWXYZ" from a single selected row in memory 152 and may not perform any shifting and may output data words "VWXYZ" to packet data sink 208 in that order. In another suitable arrangement, shifter 206 may receive "ZVWXY" from memory 152 (e.g., "VWXY" may be read out from a selected row in memory 152 whereas "Z" may be read out from another row that is adjacent to the selected row in memory 152) and may perform a "rotate one data word left" operation so that "VWXYZ" is provided to packet data sink 208. In general, any group of data words that is read out from at least two different rows in memory 152 may be rotated left using this approach. The direction in which write barrel shifter 204 rotates data should be opposite to the direction in which read barrel shifter 206 rotates data. If desired, shifter 204 may be configured to rotate data words left and shifter 206 may be configured to rotate data words right.

The addressing of memory 152 and the amount by which write barrel shifter 204 rotates data during data loading operations may be controlled using write address circuitry 210. Write address circuitry 210 may receive write address signal Addr_W from memory controller 209. Write address circuitry 210 may include a division circuit 216 operable to generate a primary write address signal Addr_Wmain by computing the quotient when signal Addr_W is divided by N (i.e., by dividing the numerical equivalent of signal Addr_W by the total number of memory blocks 200 in memory 152). Circuitry 210 may also include a modulus (MOD) circuit 214 operable to generate a secondary write address signal Addr_Wsub by computing the remainder when signal Addr_W is divided by N (i.e., by computing Addr_W modulo N).

Write address circuitry 210 may further include write control logic 218 that receives the primary and secondary write address signals from arithmetic circuits 216 and 214, respectively, and that outputs memory write address bits Addr_Wrow and write barrel shifter control bits rot_sel. Write address bits Addr_Wrow may be fed to memory blocks 200 for selectively accessing a desired row in each of memory blocks 200, whereas write barrel shifter control bits rot_sel may be fed to shifter 204 for controlling the degree of rotation that is performed by shifter 204, if any.

As an example, each memory block 200 may receive either a first version of write address bits that is used to select a given row in that memory block or a second version of write address bits that is used to select another row that is different than the given row in that memory block. The first version of write address bits may be identical to bits Addr_Wrow, whereas the second version of write address bits may be an altered version of bits Addr_Wrow (e.g., the second version of write address bits may be an incremented or decremented version of Addr_Wrow).

Similarly, the addressing of memory 152 and the amount by which read barrel shifter 206 rotates data during data retrieving operations may be controlled using read address circuitry 212. Read address circuitry 212 may receive read address signal Addr_R from memory controller 209. Read address circuitry 212 may include a division circuit 216 operable to generate a primary read address signal Addr_Rmain by computing the quotient when signal Addr_R is divided by N (i.e., by dividing the numerical equivalent of signal Addr_R by the total number of memory blocks 200 in memory 152). Circuitry 210 may also include a modulus circuit 214 operable to generate a secondary read address signal Addr_Rsub by computing the result of Addr_R modulo N.

Read address circuitry 212 may further include read control logic 220 that receives the primary and secondary read address signals from arithmetic circuits 216 and 214, respectively, and that outputs memory read address bits Addr_Rrow and read barrel shifter control bits rot_sel. Read address bits Addr_Rrow may be fed to memory blocks 200 for selectively accessing a desired row in each of the memory blocks, whereas read barrel shifter control bits rot_sel may be fed to shifter 206 for controlling the degree of rotation that is performed by shifter 206, if any.

As an example, each memory block 200 may receive either a first version of read address bits that is used to select a given row in that memory block or a second version of read address bits that is used to select another row that is different than the given row in that memory block. The first version of read address bits may be identical to bits Addr_Rrow, whereas the second version of read address bits may be computed based on bits Addr_Rrow (e.g., the second version of read address bits may be an incremented or decremented version of Addr_Rrow).

The configuration of memory array 152 and associated memory control circuitry 260 described in connection with FIG. 3 is merely illustrative and does not serve to limit the scope of the present invention. If desired, memory 152 may be organized using other suitable arrangements, and the read and write addressing circuitry may include other types of arithmetic and logic circuits for selectively addressing desired portions of memory array 152.

Figure 9:
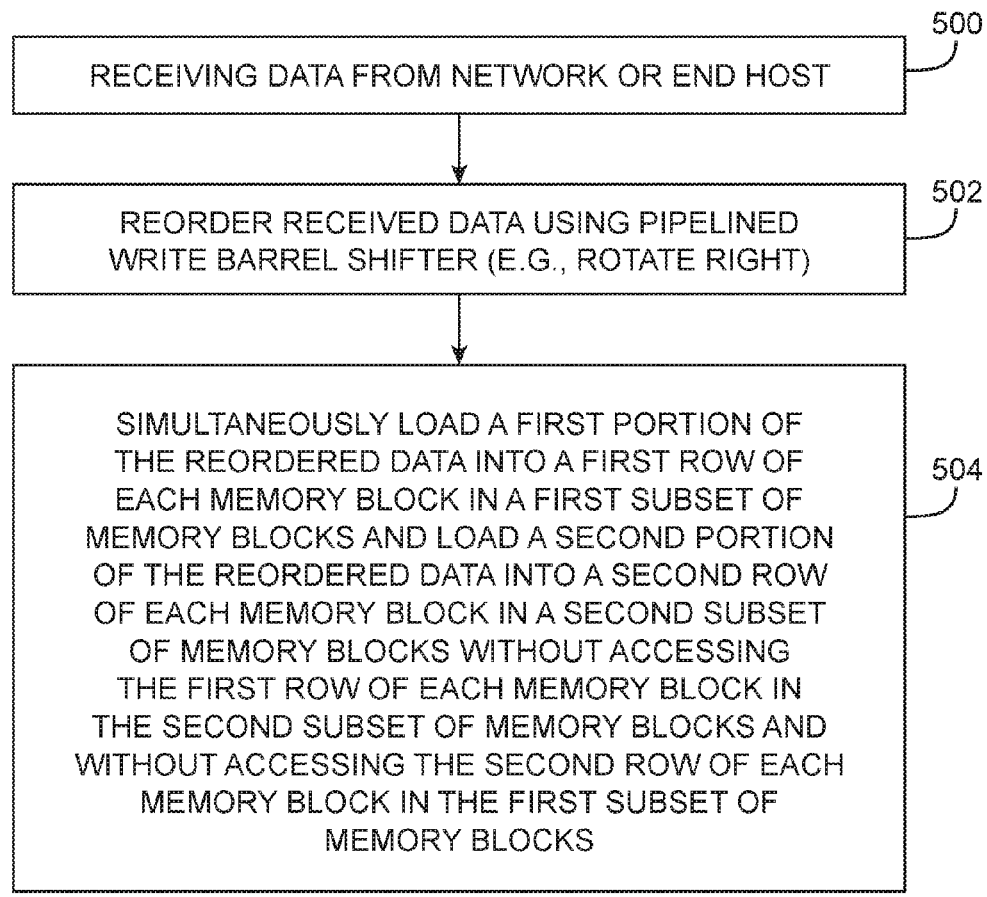
FIG. 9 is a flow chart of illustrative steps for loading data into the memory array of FIG. 3 in accordance with an embodiment of the present invention.

FIG. 9 is flow chart of illustrative steps involved in loading data into memory 152 of device 10. At step 500, device 10 may receive data from network 104 or end host 102. At step 502, the received data may be reordered using pipelined write barrel shifter 204 (e.g., the received data may be rotated right by a desired number of words). At step 504, a first portion of the reordered data may be loaded into a first row of each memory block 200 in a first subset of memory blocks in array 152 while a second portion of the reordered data is simultaneously loaded into a second row of each memory block 200 in a second subset of memory blocks in array 152.

The first row of each memory block 200 in the second subset of memory blocks and the second row of each memory block 200 in the first subset of memory blocks are not accessed while the first and second portions of the reordered data are being loaded into memory 152. During data loading operations, write address circuitry 210 may be used to generate first and second versions of a write address signal, where the first version of the write address signal is used to access the first row of each memory block 200 in the first subset of memory blocks and where the second version of the write address signal is used to access the second row of each memory block 200 in the second subset of memory blocks.

Figure 10:
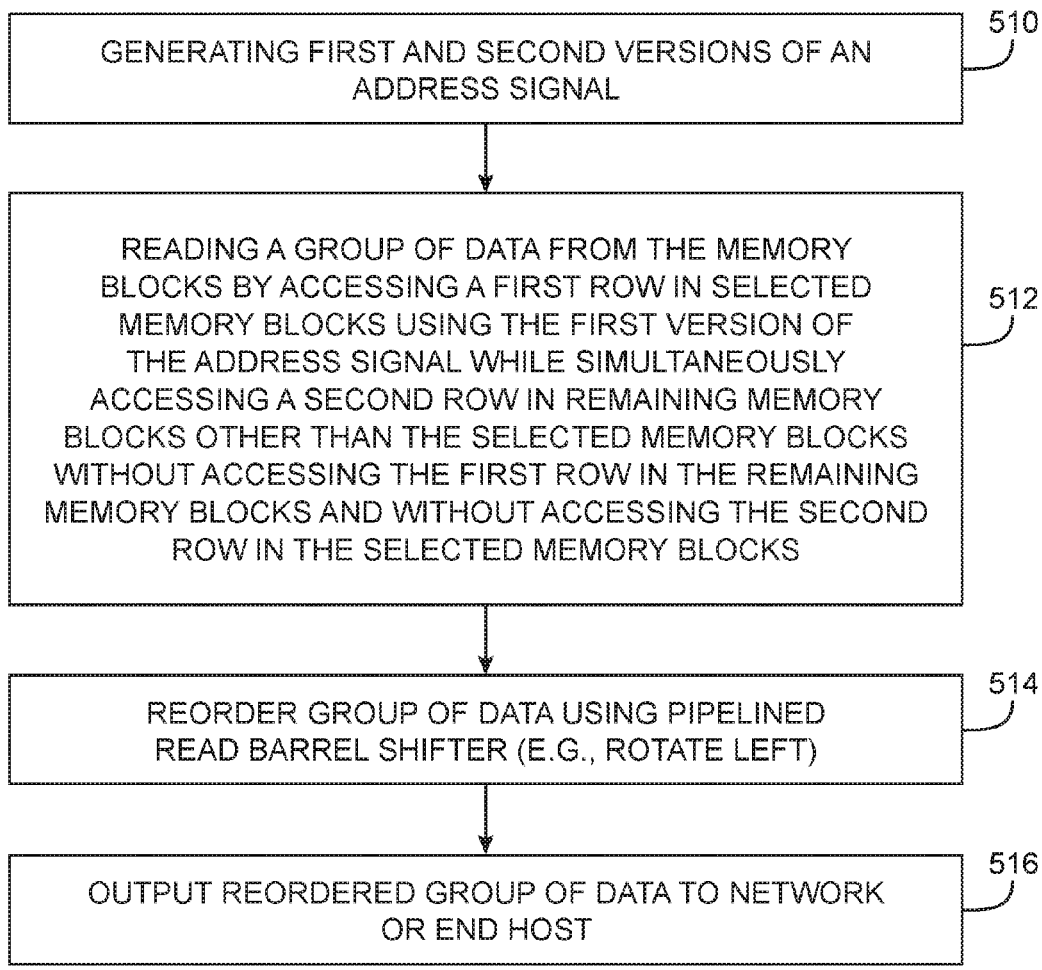
FIG. 10 is a flow chart of illustrative steps for reading data from the memory array of FIG. 3 in accordance with an embodiment of the present invention.

FIG. 10 is a flow chart of illustrative steps involved in reading data from memory 152. At step 510, read address circuitry 212 may be used to generate first and second versions of a read address signal.

At step 512, a desired group of data may be read from memory 152 by accessing a first row in selected memory blocks 200 using the first version of the read address signal while simultaneously accessing a second row in remaining memory blocks 200 other than the selected memory blocks (e.g., without accessing the first row in the remaining memory blocks and without accessing the second row in the selected memory blocks).

At step 514, pipelined read barrel shifter 216 may be used to reorder the group of read data (e.g., by rotating the group of read data left by a desired number of words). At step 516, the reordered group of data may be output to network 104 or end host 102.

Figure 4:
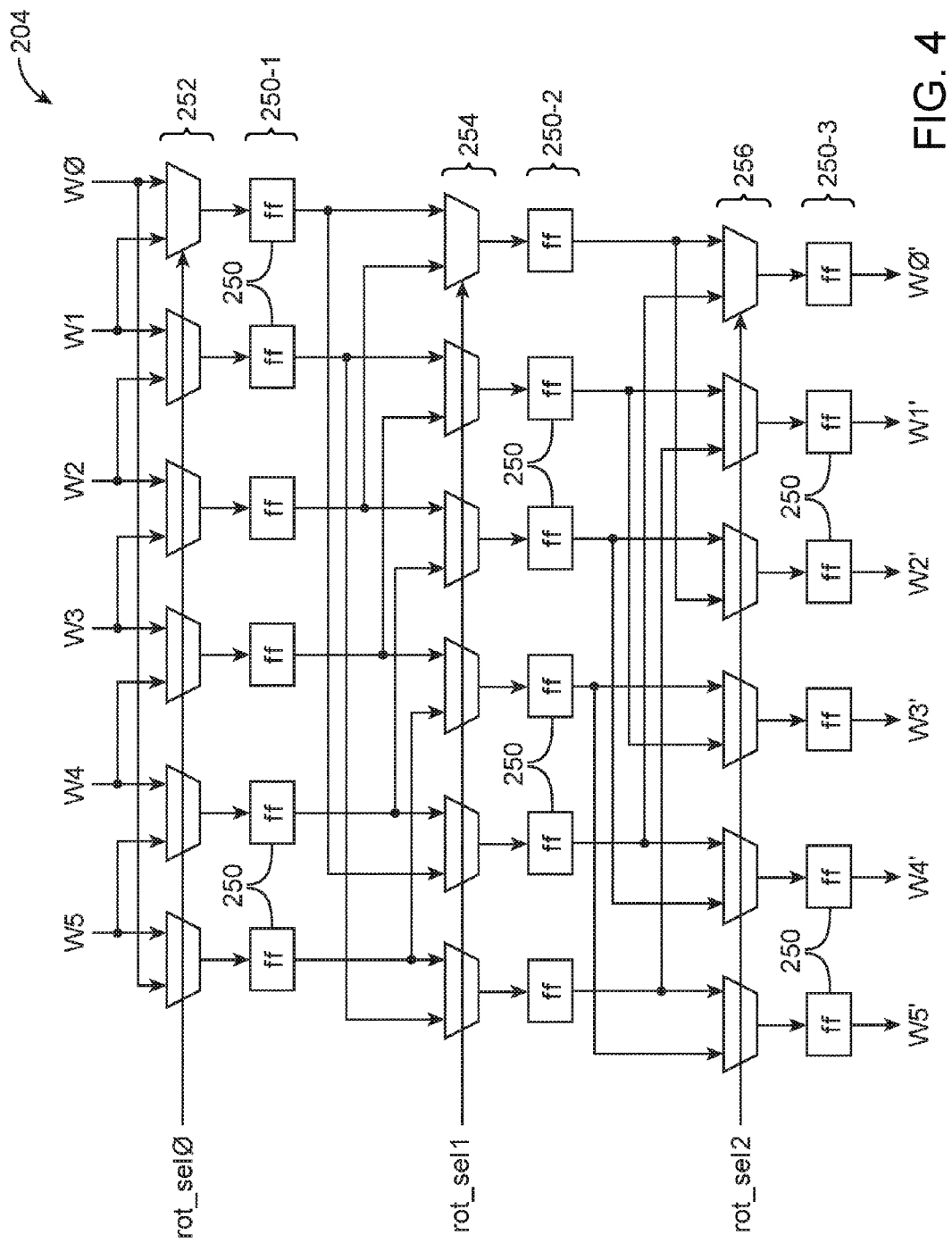
FIG. 4 is a circuit diagram of an illustrative barrel shifter in accordance with an embodiment of the present invention.

FIG. 4 is an exemplary circuit diagram of write barrel shifter 204 that is capable of receiving and rotating a group of six data words (i.e., N is equal to 6). As shown in FIG. 4, shifter 204 may include a first group of six multiplexers 252, a second group of six multiplexers 254, a third group of six multiplexers 256, and a flip-flop circuit 250 coupled to the output of each multiplexer in shifter 204 for buffering data bits.

Shifter 204 may have inputs for receiving incoming data words W5, W4, W3, W2, W1, and W0 and may have outputs on which rotated data words W5', W4', W3', W2', W1', and W0' are provided. A first multiplexer 252 in the first group of multiplexers may have a first (0) input configured to receive W0 and a second (1) input configured to receive W1; a second multiplexer 252 in the first group of multiplexers may have a first (0) input configured to receive W1 and a second (1) input configured to receive W2; . . . , and a sixth multiplexer 252 in the first group of multiplexers may have a first (0) input configured to receive W5 and a second (1) input configured to receive W0. Each of multiplexers 252 may be controlled using bit rot_sel0 generated by write control logic 218. If control bit rot_sel0 is equal to a logic "0," each of multiplexers 252 may be configured to route the word presented at its first input to its output. If control bit rot_sel0 is equal to a logic "1," each of multiplexers 252 may be configured to route the word presented at its second input to its output. Arranged in this way, multiplexers 252 may be used to effectively rotate the incoming data words right by one word when rot_sel0 is asserted. Data output by multiplexers 252 (whether or not it has been rotated) will be stored in a first group of flip-flops 250-1.

Each of multiplexers 254 may receive at its first (0) input a data word from an associated flip-flop 250-1 and at its second (1) input a data word from another flip-flop 250-1 that is two steps to the left of the associated flip-flop. Multiplexers 254 may be controlled using bit rot_sel1 generated by write control logic 218. If control bit rot_sel1 is equal to a logic "0," each of multiplexers 254 may be configured to route the word presented at its first input to its output. If control bit rot_sel1 is equal to a logic "1," each of multiplexers 254 may be configured to route the word presented at its second input to its output. Arranged in this way, multiplexers 254 may be used to effectively rotate the data words that are stored in flip-flops 250-1 right by two words when rot_sel1 is asserted. Data output by multiplexers 254 (whether or not it has been rotated) will be stored in a second group of flip-flops 250-2.

Each of multiplexers 256 may receive at its first (0) input a data word from an associated flip-flop 250-2 and at its second (1) input a data word from another flip-flop 250-2 that is two steps to the right of the associated flip-flop. Multiplexers 256 may be controlled using bit rot_sel2 generated by write control logic 218. If control bit rot_sel2 is equal to a logic "0," each of multiplexers 254 may be configured to route the word presented at its first input to its output. If control bit rot_sel2 is equal to a logic "1," each of multiplexers 256 may be configured to route the word presented at its second input to its output. Arranged in this way, multiplexers 256 may be used to effectively rotate the data words that are stored in flip-flops 250-1 right by four words when rot_sel2 is asserted. Data output by multiplexers 256 (whether or not it has been rotated) will be stored in a third group of flip-flops 250-3. Configured in this way, control bits rot_sel0, rot_sel1, and rot_sel2 (referred to collectively as rot_sel<2:0>) may be set so that an incoming group of six data words may be rotated by any suitable amount (e.g., so that the incoming group of six data words may be shifted by any desired amount).

Figure 6:
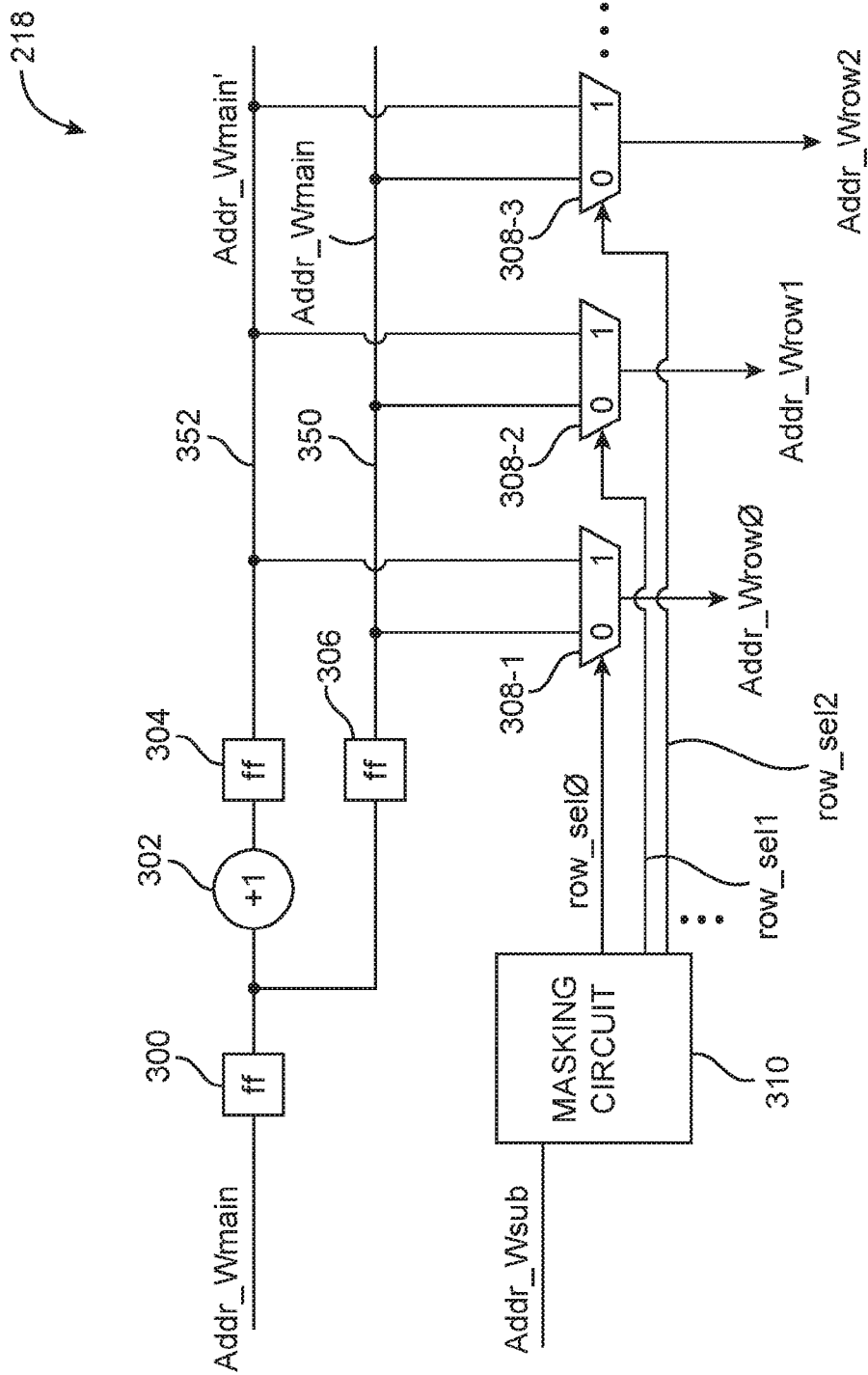
FIG. 6 is circuit diagram of control logic that is used to generate control signals for addressing the memory array of FIG. 3 in accordance with an embodiment of the present invention.

In the example of FIG. 4 in which N is equal to 6 (i.e., when N is not a power of two), write rotate control bits rot_sel may be determined based on a look-up table 290 that is implemented using write control logic 218 (see, e.g., FIG. 6). When N is equal to 6, Addr_Wsub may be equal to 0, 1, 2, 3, 4, or 5. When Addr_Wsub is equal to 0, rot_sel<2:0> may be equal to "000" (as shown in FIG. 4) so that no rotation is performed; when Addr_Wsub is equal to 1, rot_sel<2:0> may be equal to "001" so that the incoming group of six data words is rotated one word to the right; . . . , and when Addr_Wsub is equal to 5, rot_sel<2:0> may be equal to "101" so that the incoming group of six data words is rotated five words to the right.

In general, write rotate control bits rot_sel may be generated using write control logic 218 based on a predetermined look-up table when N is not a power of two. When N is equal to a power of two, rot_sel may simply be set equal to Addr_Wsub without the need of look-up table 290.

The pipelined write barrel shifter 204 shown in FIG. 4 is merely illustrative. If desired, other types of barrel shifters 204 may be used. Pipelined read barrel shifter 206 may be implemented using a similar arrangement as shifter 204 of FIG. 4, except with the wiring on the input and output reversed so that data is rotated to the left instead of being rotated to the right. This reversal of wiring can be accomplished by one skilled in the art and is not shown. Read rotate control bits rot_sel may be computed based on Addr_Rsub using a predetermined table implemented on read control logic 220 (when N is a not a power of two) or may be set equal to Addr_Rsub (when N is equal to a power of two).

Write control logic 218 may be used to generate respective sets of address bits that are fed to the different memory blocks 200. FIG. 6 is a circuit diagram showing one suitable implementation of write control logic 218. As shown in FIG. 6, write control logic 218 may include a first input operable to receive Addr_Wmain from circuit 216, a second input operable to receive Addr_Wsub from circuit 214, a masking circuit 310, N multiplexers 308 (i.e., multiplexers 308-1, 308-2, . . . , 308-N), an address adjustment circuit 302, and several buffering circuits such as flip-flops 300, 304, and 306. Flip-flop 300 may be used to buffer incoming primary address signal Addr_Wmain. An unaltered version of primary address signal Addr_Wmain may be latched using flip-flop 306, whereas an incremented version of primary address signal Addr_Wmain may be latched using flip-flop 304 (e.g., address adjustment circuit 302 may be used to adjust Addr_Wmain by an appropriate amount).

Arranged in this way, the unaltered version of Addr_Wmain may be presented at the output of flip-flop 306 on path 350, whereas the incremented version of primary address signal Addr_Wmain (indicated as Addr_Wmain' in FIG. 6) may be presented at the output of flip-flop 304 on path 352. The address signal that is provided on path 350 may, for example, be used to address a given row in a memory block 200. The incremented address signal that is provided on path 352 may instead be used to address another row that is different than the given row in a memory block 200. As an example, consider a scenario in which the address signal on path 350 can be used to select a third row in a memory block 200. The incremented address signal on path 352 can be used to select a fourth row in a memory block 200. In this example, adjustment circuit 302 effectively increments signal Addr_Wmain such that the row address is increased by one. If desired, adjustment circuit 302 may be configured to implement any desired amount of row offset.

Each multiplexer 308 may have a first (0) input that receives signal Addr_Wmain over path 350, a second (1) input that received incremented signal Addr_Wmain' over path 352, and a control input that receives a corresponding row select bit row_sel from masking circuit 310. Multiplexer 308 may be configured to route bits received at its first input to its output upon receiving a low row_sel and may be configured to route bits received at its second input to its output upon receiving a high row_sel. A first multiplexer 308-1 may provide first address bits Addr_Wrow0 that are used to select a desired row in memory block 200-1; a second multiplexer 308-2 may provide second address bits Addr_Wrow1 that are used to select a desired row in memory block 200-2; a third multiplexer 308-3 may provided third address bits Addr_Wrow2 that are used to select a desired row in memory block 200-3; etc. In particular, first multiplexer 308-1 may receive row select bits row_sel0; second multiplexer 308-2 may receive row select bits row_sel1; third multiplexer 308-3 may receive row select bits row_sel2; etc.

The row select bits may be generated using masking circuit 310 based on secondary address signals Addr_Wsub. FIG. 7 is a table showing an illustrative look-up table that is implemented by masking circuit 310. The example of FIG. 7 assumes that memory 152 includes five memory blocks 200. When Addr_Wsub is equal to 0, all the row select bits (i.e., row_sel0, row_sel1, row_sel2, row_sel3, and row_sel4) may be equal to 0 (e.g., the same given row is selected for each memory block 200). When Addr_Wsub is equal to 1, row_sel0 is driven high so that the first data word provided at the output of shifter 204 is written to another row (i.e., a row that is addressed by Addr_Wmain') that is adjacent to the given row while the remaining data words are written to the given row that is addressed by Addr_Wmain. When Addr_Wsub is equal to 2, row_sel0 and row_sel1 are driven high so that the first and second data words provided at the output of shifter 204 is written to the another row while the remaining data words are written to the given row.

Controlling multiplexers 308 using row select bits in this way allows for data words that have been rotated using write barrel shifter 204 to be written to memory block 200 in a staggered fashion (e.g., so that a first portion of the rotated data words is written to a selected row in a first group of memory blocks 200 and so that a second remaining portion of the rotated data words is written to another row that is adjacent to the selected row in a second remaining group of memory blocks 200 in memory array 152). The table of FIG. 7 therefore mirrors how the data words have been rotated (i.e., the logic zeroes represent data words that may be shifted to the right but have yet to be reordered to the front of shifter 204, whereas the logic ones represent data words that have already been reordered to the front of shifter 204).

The example of FIG. 7 in which masking circuit 310 is used to generate five row select bits is merely illustrative. If desired, masking circuit 310 may be extended to support generation of row select bits for any number of multiplexers 308. Read control logic 220 may be implemented using a similar circuit architecture as that of write control logic 218 as described in connection with FIG. 6.

The separation of memory array 152 into different memory blocks 200 and the manipulation of address signals using arithmetic circuits such as circuits 214 and 216 and masking circuits 310 allow for flexible read and write addressing schemes. For example, a group of data words need not overwrite all data in one row in memory 152. Instead, an incoming group of data words can be rotated and written into memory 152 at a desired word address in a staggered fashion. Similarly, a group of data words starting at an intermediate position within a row and that extends to an adjacent row may be selectively read out and rotated. In other words, the read and write memory operations can be provided with fine access granularity and can be decoupled from one another (e.g., read and write address circuitry may be controlled using different clocks and may process data in variable word lengths). If desired, device 10 may be reconfigured to support data loading operations for bursts of any length and to support data retrieval operations for packets of any length.

Figure 8:
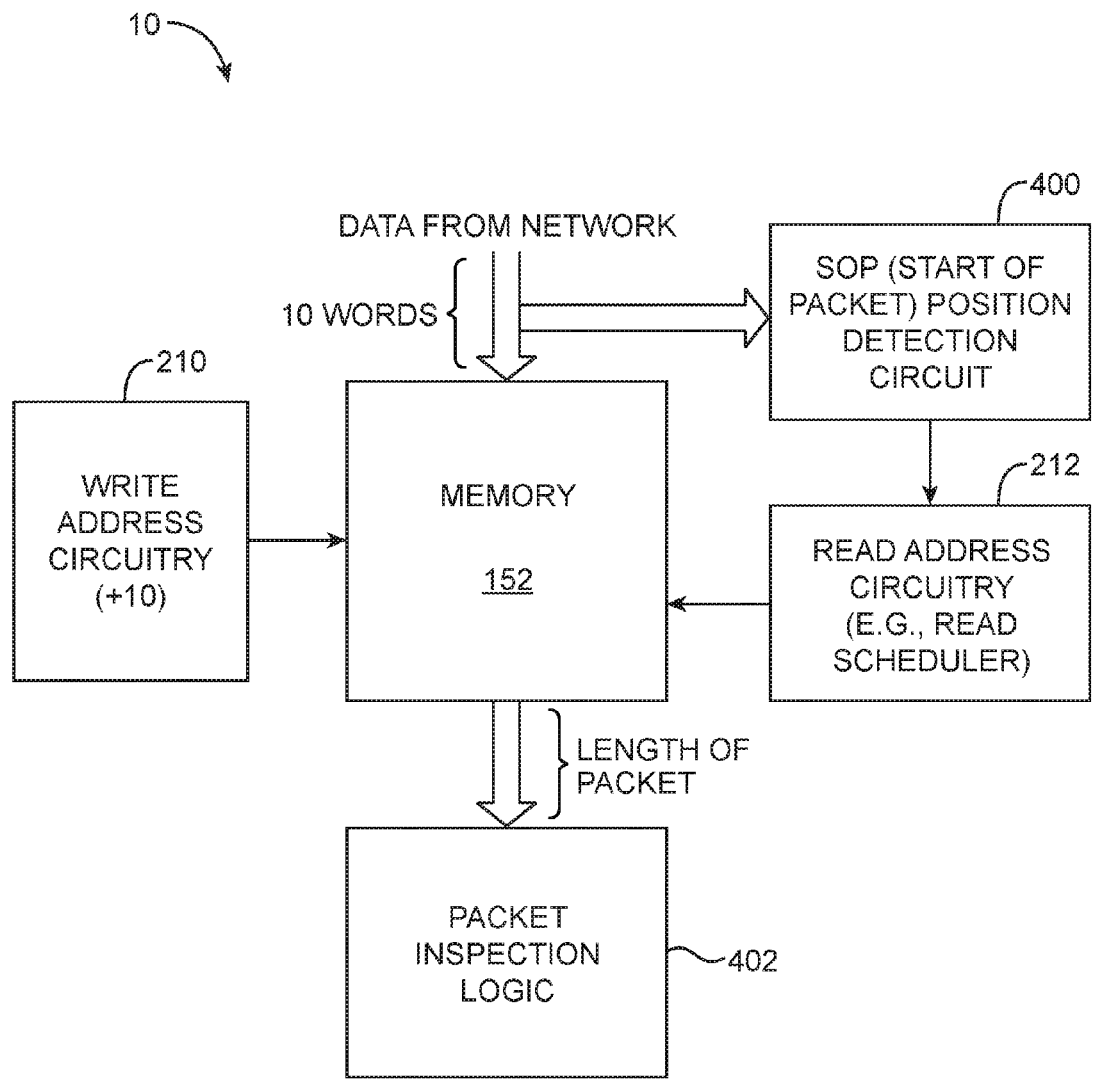
FIG. 8 is a diagram of a memory array and illustrative packet inspection circuitry in accordance with an embodiment of the present invention.

FIG. 8 shows one suitable application for this type of flexible addressing scheme. As shown in FIG. 8, device 10 may include memory 152, write address circuitry 210, read address circuitry 212, start of packet (SOP) position detection circuit 400, and packet inspection logic 402. Circuitry 210, 212, 400, and 402 may all be considered to be part of control logic 150. Control logic 150 configured using the arrangement of FIG. 8 may be used to perform packet inspection.

For example, consider a scenario in which data bursts each of which contains ten data words are arriving from the network and are being written into successive rows in memory 152 using write address circuitry 210. In this scenario, memory 152 may be organized into ten memory blocks 200. During a first time period, a first data burst may be loaded into a first row in the ten different memory blocks 200. During a second time period following the first time period, a second data burst may be loaded into a second row in the ten different memory blocks 200.

A single data packet may only include eight data words (as an example). In some scenarios, a data burst may include a complete data packet. In other scenarios, a data packet may arrive in separate data bursts (e.g., a first portion of the data packet may be included in the first data burst while a second portion of the data packet may be included in the second data burst). In scenarios in which data packets arrive in separate data bursts, it may be desirable to perform packet inspection by reading out a complete data packet.

To accomplish this, inbound data may be sequentially stored in memory 152 one row at a time. Start of packet position detection circuit 400 may monitor the arriving data bursts to determine the exact positions of packet start words (i.e., data words containing packet start headers). Read scheduler 212 may receive control signals from SOP position detection circuit 400 and may then advance the read address so that the start of the desired packet is the first data word that is read out at the output port of memory 152. Packet inspection logic 402 may only receive eight data words since a data packet only contains eight data words (e.g., two redundant data words may be discarded upon readout). Packet inspection logic 402 may therefore receive a clean view of data packets and can inspect the packet at known positions relative to the packet start header.

The example of FIG. 8 in which memory 152 can be used to support packet inspection is merely illustrative and does not serve to limit the scope of the invention. In general, a user of device 10 can treat the information that is stored in memory 152 as word addressable, allowing for data arriving in random order to be parsed according to the position of the packet headers, for conversion of the width of data streams when network interfaces of different bandwidths are aggregated (e.g., write pointers can be advanced in increments of a first number of data words, whereas read pointers can be advanced in increments of a second number of data words that is different than the first number of data words), for aggregation of packets in a multichannel system where data can arrive in variable length fragments (e.g., data can be dumped into memory 152 and selected groups of data can then be read out from memory 152 to reduce the total number of reads), etc.

The foregoing is merely illustrative of the principles of this invention and various modifications can be made by those skilled in the art without departing from the scope and spirit of the invention. The foregoing embodiments may be implemented individually or in any combination.

What is claimed is:

1. A method of operating an integrated circuit having memory that includes a plurality of memory blocks, comprising:

receiving data;

reordering the received data using at least first and second serially connected shifter circuit stages, wherein the first shifter circuit stage receives a first set of data words, wherein the second shifter circuit stage receives a second set of data words, wherein the first shifter circuit stage selectively rotates the first set of data words by a first number of words, and wherein the second shifter circuit stage selectively rotates the second set of data words by a second number of words that is different from the first number of words;

loading a first portion of the reordered data into a first row of each memory block in a first subset of memory blocks in the plurality of memory blocks;

loading a second portion of the reordered data into a second row of each memory block in a second subset of memory blocks in the plurality of memory blocks, wherein the second row is adjacent to the first row, and wherein the first and second portions of the reordered data are simultaneously loaded into the memory; and outputting the data from the memory.

2. The method defined in claim 1, wherein loading the first portion of the reordered data comprises loading the first portion of the reordered data into the first row of each memory block in the first subset of memory blocks without accessing the first row of each memory block in the second subset of memory blocks.

3. The method defined in claim 1, wherein reordering the received data comprises rotating the received data right with a barrel shifter on the integrated circuit.

4. The method defined in claim 1 further comprising:

reading a group of data from the plurality of memory blocks by accessing a third row in selected memory blocks in the plurality of memory blocks while accessing a fourth row that is different than the third row in remaining memory blocks other than the selected memory blocks in the plurality of memory blocks.

5. The method defined in claim 4, wherein reading the group of data comprises simultaneously accessing the third and fourth rows from the selected memory blocks and the remaining memory blocks in the plurality of memory blocks, respectively.

6. The method defined in claim 5, further comprising:

reordering the group of data; and outputting the reordered group of data.

7. The method defined in claim 6, wherein reordering the group of data comprises rotating the group of data left with a barrel shifter on the integrated circuit.

8. Network interface circuitry comprising:

a plurality of individually addressable memory blocks;

a modulus circuit that receives an address signal and computes a corresponding remainder value;

masking circuitry coupled to the modulus circuit, wherein the masking circuitry outputs the address signal to a first subset of memory blocks in the plurality of memory blocks based on the remainder value, wherein the masking circuitry outputs an incremented address signal to a second subset of memory blocks in the plurality of memory blocks based on the remainder value, and wherein the first subset is different than the second subset; and data reordering circuitry that receives incoming data and that reorders the incoming data to produce reordered data for loading into the memory, wherein a portion of the reordered data is loaded into a first row of each memory block in the first subset of memory blocks in the plurality of memory blocks based on the address signal while another portion of the reordered data is loaded into a second row of each memory block in the second subset of memory blocks in the plurality of memory blocks based on the incremented address signal.

9. The network interface circuitry defined in claim 8, wherein the data reordering circuitry comprises a pipelined barrel shifting circuit.

10. The network interface circuitry defined in claim 8, further comprising:

write address circuitry that receives write address signals and that outputs control bits to the data reordering circuitry and address bits to the memory.

11. The network interface circuitry defined in claim 10, wherein the write address circuitry comprises:

a modulus circuit that receives the address signals and computes corresponding remainder values based on the received address signals.

12. The network interface circuitry defined in claim 11, wherein the write address circuitry further comprises:

a division circuit that receives the address signals and computes corresponding quotient values based on the received address signals.

13. The network interface circuitry defined in claim 12, wherein the write address circuitry further comprises:

a plurality of multiplexers having data inputs coupled to the division circuit, control inputs, and outputs on which the address bits are provided; and a control circuit coupled to the modulus circuit, wherein the control circuit is operable to generate additional control bits to the control inputs of the plurality of multiplexers.

14. The network interface circuitry defined in claim 8, wherein the memory includes a reconfigurable number of individually addressable memory blocks and wherein the number of memory blocks is not a power of two.

15. A method for operating network interface circuitry having memory comprising:

loading a first group of data having a first data width into the memory via a memory interface by providing a write address to a plurality of memory blocks in the memory;

reading a second group of data having a second data width that is different than the first data width from the memory via the memory interface, wherein reading the second group of data comprises accessing only a number of memory blocks that is equal to the second data width;

reordering the second group of data using at least first and second rotator circuits that receive respective first and second input words, wherein the first rotator circuit selectively rotates the first input words by a first amount, and wherein the second rotator circuit selectively rotates the second input words by a second amount that is different from the first amount; and outputting the reordered data to external network equipment.

16. The method defined in claim 15, further comprising:

receiving the first group of data from external network equipment; and reordering the first group of data before loading the first group of data into the memory.

17. The method defined in claim 15, wherein loading the first group of data comprises:

accessing the plurality of memory blocks based on the write address while accessing another plurality of memory blocks based on another write address that is different than the write address.

18. The method defined in claim 15, wherein loading the first group of data is controlled using a write clock, and wherein reading the second group of data is controlled using a read clock that is separate from the write clock.

19. A method of operating an integrated circuit having memory blocks, comprising:

with a division circuit, generating a first version of an address signal;

generating a second version of the address signal, wherein the first version of the address signal is different than the second version of the address signal;

with a modulus circuit, generating an address control signal based on the address signal;

outputting the first version of the address signal to a first portion of the memory blocks based on the address signal;

outputting the second version of the address signal to a second portion of the memory blocks based on the address signal, wherein the second portion is different from the first portion; and accessing the first portion of the memory blocks using the first version of the address signal while simultaneously accessing the second portion of the memory blocks using the second version of the address signal.

20. The method defined in claim 19, wherein accessing the first portion of the memory blocks comprises using the first version of the address signal to access a first row of each memory block in the first portion of the memory blocks, wherein accessing the second portion of the memory blocks comprises using the second version of the address signal to access a second row of each memory block in the second portion of the memory blocks, and wherein the second row is different than the first row.

21. The method defined in claim 20, wherein accessing the first row of each memory block in the first portion of the memory blocks comprises accessing the first row of each memory block in the first portion of the memory blocks without accessing the first row of each memory block in the second portion of the memory blocks.

22. The method defined in claim 19, further comprising:
with a first group of multiplexers in a plurality of multiplexers, receiving the first and second versions of the address signal and outputting the first version of the address signal to the first portion of the memory blocks based on the address control signal; and
with a second group of multiplexers in the plurality of multiplexers, receiving the first and second versions of the address signal and outputting the second version of the address signal to the second portion of the memory blocks based on the address control signal.

23. The method defined in claim 22, further comprising:
with a control circuit, generating a respective control bit for each multiplexer in the first and second group of multiplexers based on the address control signal.

* * * * *